(No Model.)
C. T. BRIDE.
PIPE JOINT PACKING.
No. 303,615. Patented Aug. 19, 1884.
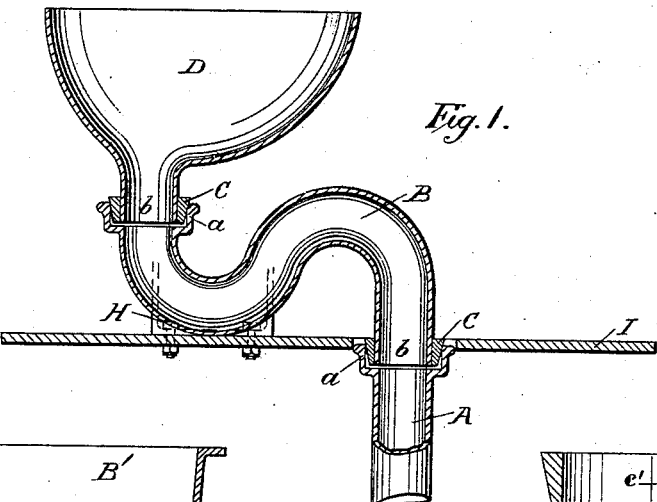
Fig. 1.
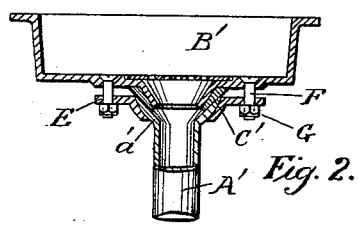
Fig. 2.
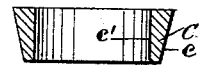
Fig. 3.
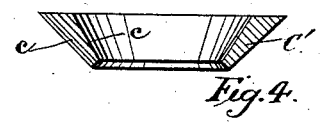
Fig. 4.
Fig. 5.
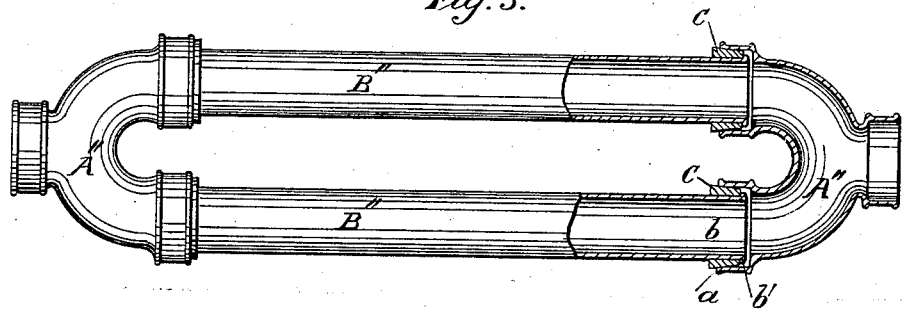
WITNESSES:
Walter Allen
Edward Stew
INVENTOR,
Cotter T. Bride
By Knight Bros.
ATTORNEYS.
N. PETERS. Photo-Lithographer. Washington. D. C.

UNITED STATES PATENT OFFICE.

COTTER T. BRIDE, OF WASHINGTON, DISTRICT OF COLUMBIA.

PIPE-JOINT PACKING.

SPECIFICATION forming part of Letters Patent No. 303,615, dated August 19, 1884.

Application filed March 8, 1884. (No model.)

*To all whom it may concern:*

Be it known that I, COTTER T. BRIDE, a citizen of the United States, residing at Washington, in the District of Columbia, have invented an Improvement in Pipe-Joint Packings, of which the following is a specification.

My invention relates to an improvement on that pipe-joint packing for which United States Letters Patent No. 274,434 were granted to me on the 20th of March, 1883.

My improvement consists in a packing-ring or gasket for connecting soil or similar pipes (where it is necessary at times to disconnect them temporarily to remove obstructions) formed of elastic material—such as vulcanized india-rubber—without a flange, having inwardly-inclined outer wall, and interposed as in said patent, between the outside of the discharge end of one pipe and the inside of the receiving end of the other pipe, the pipes being wedged together by the packing and readily separated, as heretofore.

In order that my invention may be fully understood, I will proceed to describe it with reference to the accompanying drawings, in which—

Figure 1 is a vertical section through a water-closet hopper, S-trap, and soil-pipe, showing my improved packing-ring or gasket applied to the joints thereof. Fig. 2 is a vertical section through a sink and waste-pipe, showing my improved form of packing-ring or gasket applied to the joint thereof. Fig. 3 is an axial section, on a larger scale, of the pipe packing-ring or gasket. Fig. 4 is an axial section, on a larger scale, of sink-joint, packing-ring, or gasket. Fig. 5 shows, partly in side elevation and partly in section, hot-water pipes for greenhouses having my improved packing-ring or gasket for the joints thereof.

Referring to Fig. 1, A is a soil-pipe having a hub or bell, $a$, forming a socket to receive the discharge end $b$ of an S-trap, B, which is formed with a hub or bell, $a$, to receive the discharge end $b$ of the hopper D.

H is a flange beneath the first bend of the trap, by which the trap can be secured to the floor I, instead of by a flat flange surrounding the discharge end of the trap.

My improved packing-ring or gasket is adapted to either form of discharge end, though it is especially designed for use with flangeless discharge ends of pipes.

C is my improved form of packing-ring or gasket. (Shown on a larger scale in Fig. 3.) This differs from that shown in my patent already referred to, being formed without a flange.

My improved ring or gasket is formed, as heretofore, of vulcanized india-rubber or analogous elastic material, having inwardly-inclined outer wall, $c$, and inner wall, $c'$, to fit around the end of the inner pipe. By dispensing with the flange and extending the outer wall, $c$, in a straight line to the top edge of the packing-ring or gasket there is no shoulder to interfere with the proper wedging of the packing-ring or gasket against the edge of the socket.

In Fig. 2 I show a sink, B', having waste-pipe A', connected to its coupling by clamp-ring E, bolts F, and nuts G. To pack the joint between the coupling and waste-pipe, I employ a packing-ring or gasket, C', (shown in Fig. 4,) having its outer and inner walls inclined inwardly.

In Fig. 5 I show the application of my packing-ring or gasket to hot-water pipes for greenhouses, where a readily-removable packing-ring or gasket is desirable.

A'' represents return-bends, and B'' pipe-sections, having beads $b'$ projecting outwardly at their ends.

In applying my packing-ring or gasket to this form of pipe-section the ring is preferably stretched and sprung thereon in rear of the bead, and then the pipe end with the ring is pressed into the socket. The bead projecting in front of the gasket assists its withdrawal in removing a pipe.

Having thus described my invention, the following is what I claim as new therein and desire to secure by Letters Patent:

A packing-ring or gasket for connecting soil or similar pipes, formed of elastic material without a flange, and having inwardly-inclined outer wall, in combination with a pipe end and pipe hub or bell, the packing-ring or gasket being applied in the manner shown and described.

COTTER T. BRIDE.

Witnesses:
WALTER ALLEN,
EDWARD M. BENTLEY.